US 008843768B2

(12) United States Patent
Vogel

(10) Patent No.: US 8,843,768 B2
(45) Date of Patent: Sep. 23, 2014

(54) SECURITY-ENABLED STORAGE CONTROLLER

(75) Inventor: Danny Vogel, Sudbury, MA (US)

(73) Assignee: Netapp, Inc., Sunnyvale, CA (US)

( * ) Notice: Subject to any disclaimer, the term of this patent is extended or adjusted under 35 U.S.C. 154(b) by 1180 days.

(21) Appl. No.: 11/516,232

(22) Filed: Sep. 5, 2006

(65) Prior Publication Data

US 2008/0059795 A1    Mar. 6, 2008

(51) Int. Cl.
*H04L 29/06* (2006.01)
*G06F 21/80* (2013.01)
*G06F 21/78* (2013.01)
*G06F 21/62* (2013.01)

(52) U.S. Cl.
CPC .............. *G06F 21/80* (2013.01); *G06F 21/78* (2013.01); *G06F 21/6218* (2013.01)
USPC ............................................ 713/193; 726/26

(58) Field of Classification Search
CPC ...... G06F 21/6218; G06F 21/78; G06F 21/80
USPC .......................................... 713/193; 726/26
See application file for complete search history.

(56) References Cited

U.S. PATENT DOCUMENTS

| | | | | |
|---|---|---|---|---|
| 5,651,064 | A * | 7/1997 | Newell | 705/51 |
| 6,857,076 | B1 * | 2/2005 | Klein | 713/189 |
| 7,096,370 | B1 * | 8/2006 | Klein | 713/193 |
| 7,272,727 | B2 * | 9/2007 | Mimatsu | 713/193 |
| 7,325,097 | B1 * | 1/2008 | Darcy | 711/117 |
| 7,372,962 | B2 * | 5/2008 | Fujimoto et al. | 380/255 |
| 7,401,197 | B2 * | 7/2008 | Kezuka et al. | 711/164 |
| 7,457,897 | B1 * | 11/2008 | Lee et al. | 710/74 |
| 7,460,672 | B2 * | 12/2008 | Klein | 380/278 |
| 7,516,903 | B2 * | 4/2009 | Nishizawa et al. | 235/492 |
| 2002/0114453 | A1 * | 8/2002 | Bartholet et al. | 380/44 |
| 2002/0157011 | A1 * | 10/2002 | Thomas, III | 713/193 |
| 2004/0243734 | A1 * | 12/2004 | Kitagawa et al. | 710/13 |
| 2005/0154826 | A1 * | 7/2005 | Marks et al. | 711/114 |
| 2006/0015946 | A1 * | 1/2006 | Yagawa | 726/32 |
| 2006/0085636 | A1 * | 4/2006 | Osaki | 713/165 |
| 2006/0136644 | A1 * | 6/2006 | Martin et al. | 710/302 |
| 2006/0143505 | A1 * | 6/2006 | Olarig et al. | 714/6 |
| 2006/0294331 | A1 * | 12/2006 | Forrer et al. | 711/163 |
| 2007/0088978 | A1 * | 4/2007 | Lucas et al. | 714/9 |
| 2007/0136606 | A1 * | 6/2007 | Mizuno | 713/189 |
| 2007/0180239 | A1 * | 8/2007 | Fujibayashi et al. | 713/165 |
| 2007/0195447 | A1 * | 8/2007 | Starr et al. | 360/72.1 |
| 2009/0022320 | A1 * | 1/2009 | Furukawa et al. | 380/278 |

OTHER PUBLICATIONS

IEEE P1619 D5, "Draft Standard Architecture for Encrypted Shared Storage Media," Mar. 23, 2006, 27 pages.*

* cited by examiner

*Primary Examiner* — Michael Pyzocha
(74) *Attorney, Agent, or Firm* — Haynes and Boone, LLP

(57) ABSTRACT

An apparatus and method are described for encrypting and decrypting information stored in a plurality of disk drives located within a large storage system. In various embodiments of the invention, encryption and decryption processes are implemented within a storage controller or controllers in the storage system.

18 Claims, 5 Drawing Sheets

SECURITY-ENABLED STORAGE CONTROLLER

BACKGROUND

A. Technical Field

This invention relates generally to data security in computer systems, and more particularly, to the encryption of data stored in mass storage devices.

B. Background of the Invention

Computer data may be stored in various types of memory devices such as mass storage devices, personal computers, and other personal storage devices like personal digital assistants ("PDAs") and compact flash memory devices. The security of this data stored on these devices is a concern due to the increasing frequency of data hacking and other theft of computer equipments and the data thereon. For example, large storage systems often contain very valuable information but may also have numerous points of entry that may potentially allow an unauthorized individual to hack into the system and access this information. Additionally, people are increasingly maintaining personal information on their computers, PDAs and other mobile devices. If these devices are lost or stolen, this information may be easily retrieved and used unless it is sufficiently protected.

In light of these issues, protecting this data that is stored in these different types of devices is becoming increasingly important. There are various approaches currently being considered and implemented that attempt to improve the security of data stored on these devices. One such approach is storing the data in an encrypted format within these different storage devices so that the encrypted data may only be read by first recovering the original data through one or more decryption procedures.

Encryption chips, blocks and other devices may use a number of different encryption techniques to encrypt data stored on drives. For example, Data Encryption Standard ("DES") was commonly used within the industry for multiple encryption needs including communications, but has been replaced by the advent of Internet Protocol Security ("IPSec"). IPsec is a standard for securing Internet Protocol ("IP") communications by encrypting and/or authenticating the IP packets within a data stream. IPSec incorporates a number of the previous encryption standards including DES and Advanced Encryption Standard ("AES"), and includes random number generators or key exchange algorithms that improve data security. These encryption chips supporting IPsec for communications encryption needs, may provide more services than would be required for protecting data at rest such as specified by a standard such as IEEE Project 1619. Project 1619 incorporates the use of the AES standard.

Storage drive providers are starting to provide data encryption processes that operate on their drives by encrypting data at one or more disk drives. In particular, disk drive manufacturers are performing encryption techniques within the drives that is storing the particular data. This approach significantly improves the security of data but also present shortcomings in encrypting data across large storage systems having interoperable drives, such as a Redundant Array of Independent Disks ("RAID") storage system. The complexity, scalability and interaction between the disks within these systems make efficient data encryption at the disks very difficult and inefficient. Another technique that is currently being implemented is encrypting data at a host system within a mass storage system.

FIG. 1 illustrates an exemplary layout of a mass storage system 100 that stores data on a plurality of disk drives 105. The system 100 has a host 101, a plurality of controllers 103 and expanders 104 that interface with the plurality drives 105. A general-purpose encryption device 102 is also shown in the host system 101. The data is received at the host system 101 and encrypted through the encryption device 102 before it is sent to the main drives or memories 105. There may also be a number of expanders connected to the drives 105 through which the data travels IN or OUT of the mass storage system 100.

The cost of the general-purpose encryption device 102 varies depending on the rate at which data is encrypted. For example, if the encryption device 102 encrypts data at a low speed of about 1 GB/sec, then it is relatively inexpensive. However, if the encryption device 102 encrypts data at a high speed of about 10 GB/sec, then it is moderately expensive. Currently, there are very few encryption devices that are able to operate at 40 GB/sec, and they are extremely expensive.

Positioning general-purpose encryption chips within the host system 100 or between the host system 100 and the controllers 103 may create a bottleneck within the storage system because of bandwidth mismatches. For instance, an encryption chip operating at a rate of 10 GB/sec may efficiently operate within a system of a few drives. However, as the number of drives within the system increase, then the bandwidth demands on the encryption chip increases which may effectively overburden its processing power. As a result, the performance of the system may significantly decline as data is waiting to be encrypted or decrypted at the general purpose encryption chip. In addition, the use of a general-purpose encryption chip may also present power issues as it is the exclusive location in which data is being encrypted and decrypted.

SUMMARY OF THE INVENTION

An apparatus and method are described for encrypting and decrypting information stored in a plurality of disk drives located within a large storage system. In various embodiments of the invention, encryption and decryption processes are implemented within a storage controller or controllers in the storage system. A controller receives data from a host system and generates a plurality of security keys including encryption keys and decrypting keys for the data and associates these keys with corresponding storage location(s) of the data. The encryption keys are used to encrypt the data at the controller and transmit the encrypted data to be subsequently stored. The controller also receives encrypted data from the disk drives and decrypts this data using the previously generated keys. Once the data has been decrypted, it is provided to the host system for further processing.

The location of encryption and decryption modules or blocks within storage controllers allows encryption and decryption processes to be efficiently performed. Because these processes may be spread across multiple controllers, the likelihood of bottlenecks at the encryption location(s) is significantly reduced. Additionally, a storage system, and the encryption therein, can be efficiently scaled because security functionality may be provided by an associated controller of new or replaced disks within a disk array.

In one embodiment of the present invention, a mass storage system is provided with an encryption-enabled controller. A first interface of the encryption-enabled controller is coupled to a host system through a Peripheral Component Interconnect ("PCI") interface and a second interface is coupled to a plurality of disk drives. An expander may be used to physically connect the encryption-enabled controller and the multiple drives.

The encryption-enabled controller has one or more encryption blocks that defines the processes in which data is encrypted prior to storage. These blocks may include encryption and decryption key generators and a look-up table to keep track of each security key and its associated packet of data. An internal optional memory within the encryption-enabled controller may be provided to store the look-up table. An external optional memory such as NVSRAM, FLASH, SRAM etc. may also be provided to the encryption-enabled controller to facilitate buffering any sort of data related to its processing function.

In one embodiment of the invention, the encryption-enabled controller may generate security keys and associate each such key to its corresponding data and storage location by using processes associated with Project 1619 (P1619) from IEEE, a standard encryption method that may be implemented within the encryption-enabled controller. The security keys may include different sets of encryption keys including a Host-System key particular for that host, Disk-Drive keys wherein a specific key is allotted to a specific disk drive and a Block-Level key that changes depending upon the various blocks of data accessed within each drive.

In an alternate embodiment of the invention, an encryption chip may be located between a controller and expander within a large storage system. This embodiment would allow data encryption using previously installed controllers without having to insert a single large general-purpose encryption chip.

Other objects, features and advantages of the invention will be apparent from the drawings, and from the detailed description that follows below.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

An apparatus and method are described for encrypting and decrypting information stored in a plurality of disk drives located within a large storage system. In various embodiments of the invention, encryption and decryption processes are implemented within a storage controller or controllers in the storage system.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including storage environments. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Overview

Figure 1:
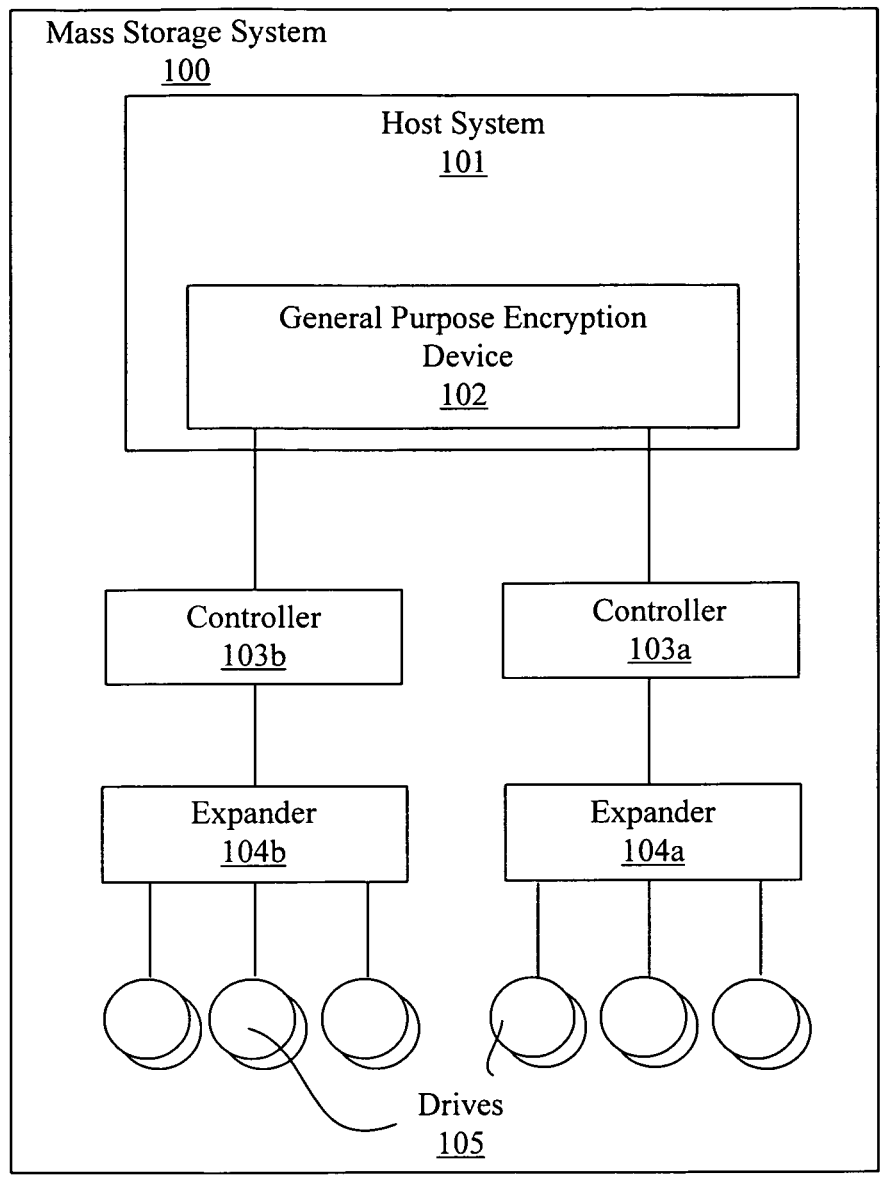
FIG. 1 shows a storage system having a general-purpose encryption device implemented within a host system.
Figure 2:
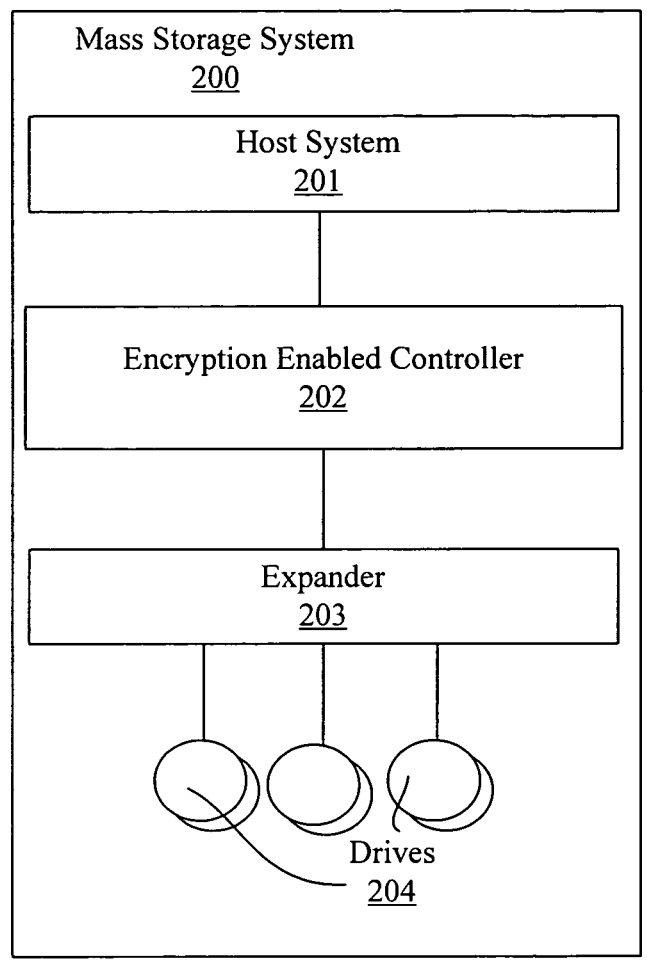
FIG. 2 is a diagram of a storage system having an encryption-enabled according to various embodiments of the invention.

FIG. 2 is a diagram of a large storage system having a plurality of disk drives according to various embodiments of the invention. The storage system 200 contains a host system 201, an encryption-enabled controller 202, an expander 203, and a plurality of memory drives 204. In general, the host system 201 provides a central processing unit and other essential operating applications for managing data to be stored or retrieved from the drives 204. The host system 201 also generates various commands relating to writing data to the memory drives 204 and reading data from the memory drives 204. The encryption-enabled controller 202 is an intermediary device between the host system 201 and the drives 204 such that data being stored or retrieved by the system is communicated through the controller 202. The encryption-enabled controller 202 may be a Direct Memory Access ("DMA") controller or any other controller that controls data access to the drives 204. In various embodiments of the invention, the encryption-enabled controller 202 provides encryption and decryption processes within this data path between the host system 201 and the drives 204.

The encryption-enabled controller 202 communicate with the host system 201 through a peripheral component interface (such as one on a PCI card) to receive data that is to be stored on the memory drives 204. The encryption-enabled controller 202 generates security keys by using various available encryption and decryption processes. The controller 202 also associates these keys with the data and/or location within the drives 204 where the data is to be stored.

In various embodiments of the invention, the security keys may be generated by using a standard encryption process such as Project 1619 ("P1619") from IEEE, that are implemented fully or in part within the controller, and fully or in part by the host system. The generated encryption keys are subsequently used to encrypt the data before it is sent to the drives by the encryption-enabled controller. In order to access and read the data subsequent to this storage, a decryption process must be performed in which decryption keys are required. As a result, if someone should gain access to the storage drives, they are only able to read data that had not been encrypted.

These security keys may be generated using various techniques and methods within the encryption-enabled controller 202. In various embodiments of the invention, a unique set of security keys are generated for data or block of data and its corresponding storage location. These keys may include different sets of encryption keys including a Host System key particular for that host, Disk Drive keys wherein a specific key is allotted to a specific disk drive and a Block Level key that changes depending upon the various blocks of data accessed within each drive.

B. Encryption-Enabled Controller

Figure 3:
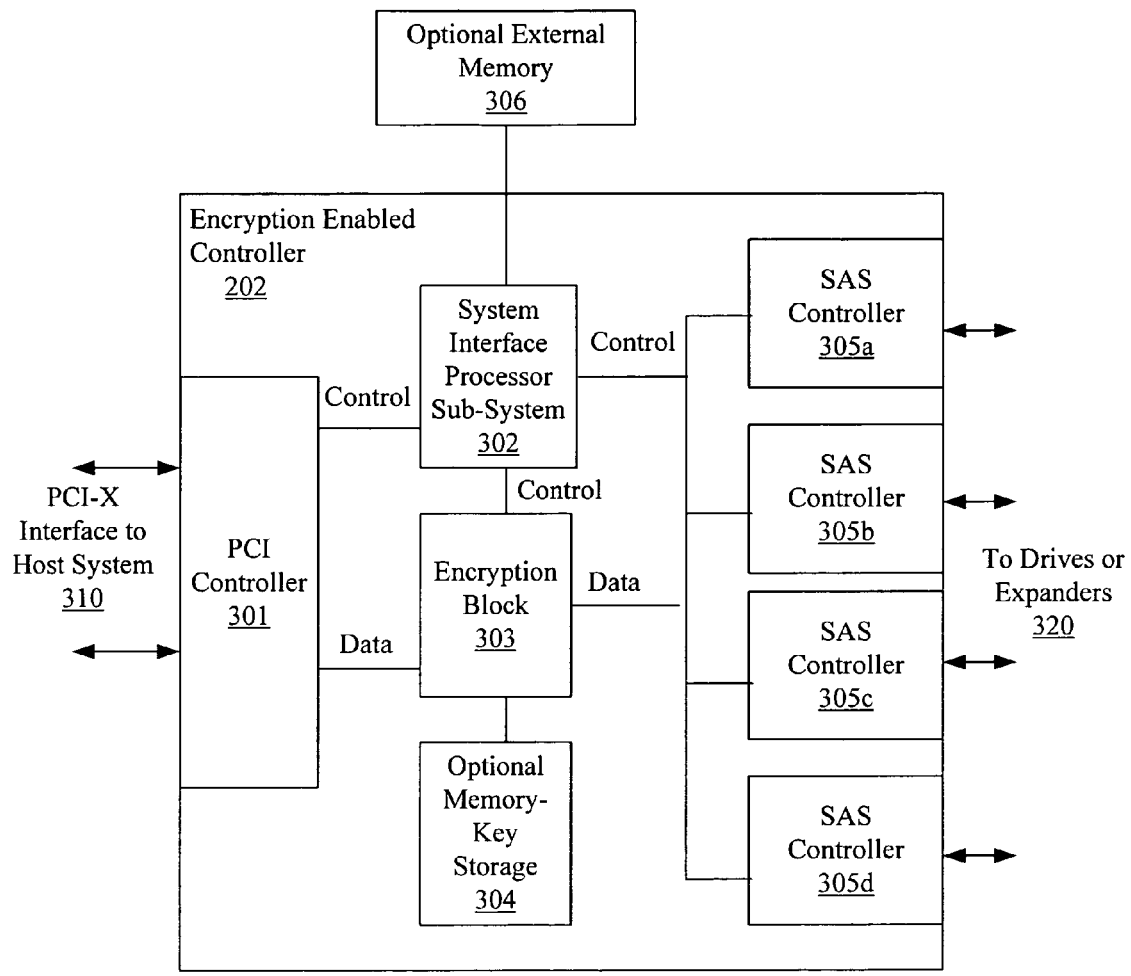
FIG. 3 is a block diagram of an encryption-enabled controller according to various embodiments of the invention

FIG. 3 is a block diagram of an encryption-enabled controller 202 that may be preloaded with the encryption processes to encrypt data prior to storage according to various embodiments of the invention. Data from a host system may be received through a PCI interface 310 that couples the encryption-enabled controller 202 to the host system. The encryption-enabled controller 202 comprises a PCI controller 301 that controls both a physical layer and link layer at the PCI interface 310.

A system interface processor subsystem 302 is located in the control path between the PCI controller 301 and the SAS controller(s) 305, which are connected to the actual drives 203 or expanders 204. The system interface processor subsystem 302 may also be coupled to an optional external memory device 306, such as an NVSRAM, FLASH, SRAM etc., that stores information related to the management of the controller 202 and processing of control data received from the PCI controller 301. The external optional memory 306 may be accessed by the system interface processor subsystem 302 for buffering any sort of data related to its processing function. The system interface processor subsystem 302 processes the control data from the host system and manages the encryption of data and association of storage locations with the encrypted data.

An encryption block module 303 is positioned in the data path between the PCI Controller 301 and the SAS Controller (s) 305. The encryption block module 303 may also be coupled to an optional storage device, either on-chip or off-chip, on which security keys and other information may be stored. The encryption block module 303 is also communicatively coupled to the system interface processor subsystem 302. As previously described, the encryption block module 303 provides the encryption and decryption of the encrypted data that is stored in the disk drives and may additionally generate, all or in part as previously described, the keys used for the encryption and decryption. In various embodiments of the invention, a look-up table is generated that stores these keys, data storage addresses, etc. to enable this decryption process to properly occur. In one embodiment, the look-up table comprises columns or rows that include encryption keys and data storage locations within the disk drives. The encryption block module 303 may employ various types of encryption and decryption processes to perform these functions including the use of AES to encode data prior to storage and decode data upon retrieval.

The SAS controller modules 305 are connected to the disk drives according to the Serial Attached SCSI ("SAS") standard. It is important to note that other embodiments of the invention may use other protocols, standards or methods to connect with the disk drives.

According to various embodiments of the invention, a high speed PCI controller interface 310 is employed that allows for data rates up to 10 GB/sec. As the number of drives associated with the controller 202 expands, this high speed interface will be able to process data at sufficient rates to avoid bottlenecks. If the number of drives becomes too large, then the controller 202 may create a bottleneck. In such a scenario, some of these drives may be associated with a previously installed, less-burdened controller or a new controller with data encryption may be installed within the system and associated with some of these drives.

One skilled in the art will recognize that locating encryption and decryption blocks within a storage controller provides more efficient scalability within an encryption-enabled storage system. In addition, the likelihood of data bottlenecks within the storage system is significantly reduced because of the ability to manage the encryption and decryption processes across a plurality of storage controllers within the system.

C. Method of Encrypting/Decrypting Data

Figure 4:
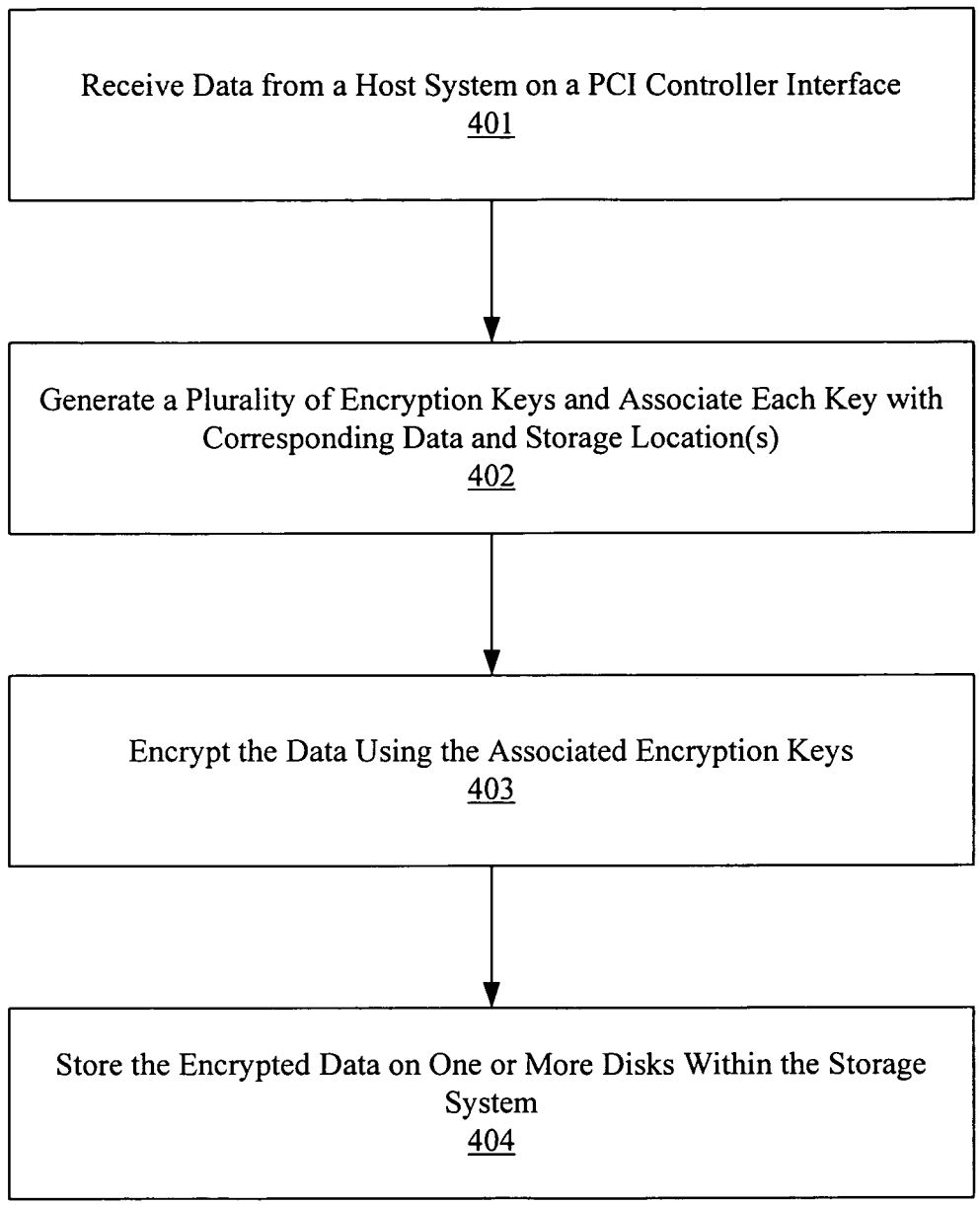
FIG. 4 is a flowchart illustrating a method for storing encrypted data on one or more disk drives according to various embodiments of the invention.

FIG. 4 shows a flowchart illustrating a method, independent of structure, for encrypting and storing data within a multi-disk storage system according to various embodiments of the invention. Data is received 401 at a storage controller from a host system via an interface, such as an interface on a PCI card. A plurality of encryption keys is generated 402 and each key is associated with particular data and one or more storage locations of the particular data. These keys may be generated using numerous types of methods including those defined by the P1619 standard.

The encryption keys are subsequently used to encrypt 403 the data so that it is unreadable without performing a decryption process. These keys and storage location(s) of the data are then stored locally on the controller card or on external memory that is coupled to controller card. After the data has been encrypted, it is stored 404 on one or more drives within the storage system.

In an alternative embodiment of the invention, the controller card is able to select whether data should be encrypted or not. For example, if particular data is deemed valuable or otherwise important, then it is encrypted by the controller. However, if the data is not considered important, then the controller may store that data without previously encrypting it. This selective encryption procedure may increase the amount of data that the controller can process because certain data does not require the encryption processes.

Figure 5:
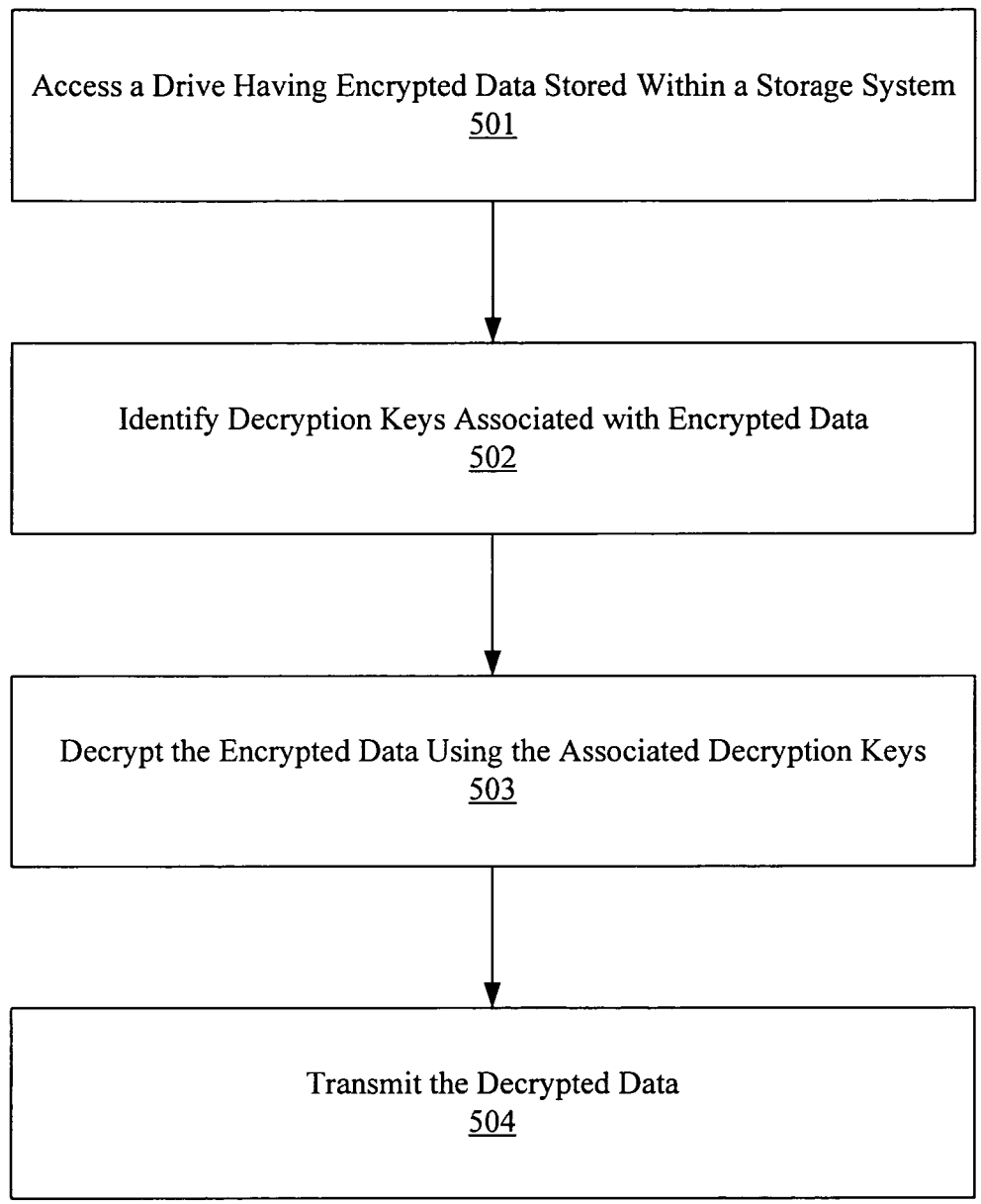
FIG. 5 is a flowchart illustrating a method for retrieving stored encrypted data from one or more disk drives according to various embodiments of the invention.

FIG. 5 is a flowchart illustrating a method, independent of structure, for retrieving the stored encrypted data according to various embodiments of the invention. The method may be initiated by receiving a command from a host system and accessing 501 a drive(s) having encrypted data stored therein. The previously generated keys, stored for example within a look-up table, are identified using the location of the data or other association means. In one embodiment, a set of decryption keys, associated with the storage location of the particular block of encrypted data, are identified 502 by the controller.

Using the decryption keys, the stored data is read from the drives and decrypted 503 on the controller. In various embodiments of the invention, this decryption process may occur in other locations because the encrypted data and decryption keys may be transmitted from the controller to another processing device. Once the data has been decrypted, it may be transmitted 504 to various computer devices to enable processing, storage, visualization or other processing of the decrypted data.

While the present invention has been described with reference to certain exemplary embodiments, those skilled in the art will recognize that various modifications may be provided. Accordingly, the scope of the invention is to be limited only by the following claims.

I claim:

1. A storage controller comprising:
 a first interface on which data commands for reading and writing data are received from a data-managing application on a host system, the storage controller being a physically separate machine from the host system;

an encryption block module, coupled to receive the data from the first interface, the encryption block module generating a plurality of security keys to encrypt the data, wherein a first one of the security keys is assigned to the host system and is used to encrypt the data received from the host system;

non-volatile memory, coupled to the encryption block module, that stores the security keys and an indication of a storage location of the data;

a storage protocol module, coupled to the encryption block module that transmits the data encrypted using the first security key to at least one storage drive;

the storage protocol module interfaces with a plurality of expanders;

and a plurality of encryption chips being coupled between the storage controller and the expanders.

2. The storage controller of claim 1 wherein the storage protocol module comprises at least one Serial Attached SCSI controller.

3. The storage controller of claim 1 wherein the first interface comprises a peripheral component interconnect interface.

4. The storage controller of claim 1 further comprising a PCI controller coupled to the first interface and the encryption block module, that provides link layer and physical layer functionality.

5. The storage controller of claim 1 wherein the non-volatile memory comprises a memory key storage device, located in the controller apparatus and coupled to the encryption block module.

6. The storage controller of claim 1 further comprising a second interface that stores information related to the operation and management of the controller apparatus in an external memory device.

7. The storage controller of claim 1 further comprising a decryption block module, coupled to the non-volatile memory, that retrieves at least one of the security keys assigned to the at least one storage drive and decrypts data retrieved from the at least one storage drive.

8. The storage controller of claim 1 wherein the encryption block module encrypts data in accordance with P1619 protocols.

9. A storage system for reading and writing data, the storage system comprising:
a host system with a data-managing application that generates read and write commands associated with the data;
a plurality of storage controllers, each storage controller coupled to the host system and having at least one encryption block module to encrypt data when processing write commands, the plurality of storage controllers being physically separate machines from the host system;
a plurality of expanders that are coupled to the plurality of storage controllers;
a plurality of encryption chips being coupled between the storage controllers and the expanders; and
a plurality of storage drives, coupled to the plurality of storage controllers, that store data encrypted by the storage controllers, each of the storage drives being assigned a security key.

10. The storage system of claim 9 wherein the plurality of storage controllers, the plurality of expanders and the plurality of storage drives communicate on Serially Attached SCSI (SAS) connections.

11. The storage system of claim 9 further comprising non-volatile memory, coupled to the plurality of storage controllers, that stores the assigned security keys and data related to the operation of the plurality of storage controllers.

12. The storage system of claim 9 wherein the plurality of storage controllers generate the assigned security keys.

13. The security-enabled storage system of claim 12 wherein the assigned security keys are generated in accordance with P1619 protocols.

14. The security-enabled storage system of claim 12 wherein the assigned security keys are stored within a look-up table located on at least one of the plurality of storage controllers.

15. A method for securely storing information on a storage drive, the method comprising:
receiving a write command at a storage controller, the write command specifying that data be stored in a mass storage system, the write command being received from a host computer, wherein the storage controller is a physically separate machine from the host computer;
in response to the write command, generating an encryption key and a decryption key at the storage controller, the encryption key and the decryption key being assigned to the host computer;
encrypting the data using the encryption key in one of a plurality of encryption chips coupled between the storage controller and a plurality of expanders;
associating the decryption key with a storage location on a storage drive;
storing the decryption keys and an indication of the storage location within the storage controller; and
storing the data at the storage location on the storage drive.

16. The method of claim 15 wherein the storage controller is located on a PCI card that is inserted within a storage system and interfaces with the host computer.

17. The method of claim 15 wherein the data is encrypted in accordance with P1619 protocols.

18. The method of claim 15 further comprising the steps of:
retrieving the encrypted data from the storage location to the storage controller;
using a look-up table to access the decryption key;
decrypting the encrypted data at the storage controller using the decryption key; and
transmitting the decrypted data from the storage controller to a host system processor.

* * * * *